Dec. 17, 1968    L. J. WINDECKER    3,416,756
AIRFOIL STRUCTURE
Filed Aug. 3, 1966    2 Sheets-Sheet 1
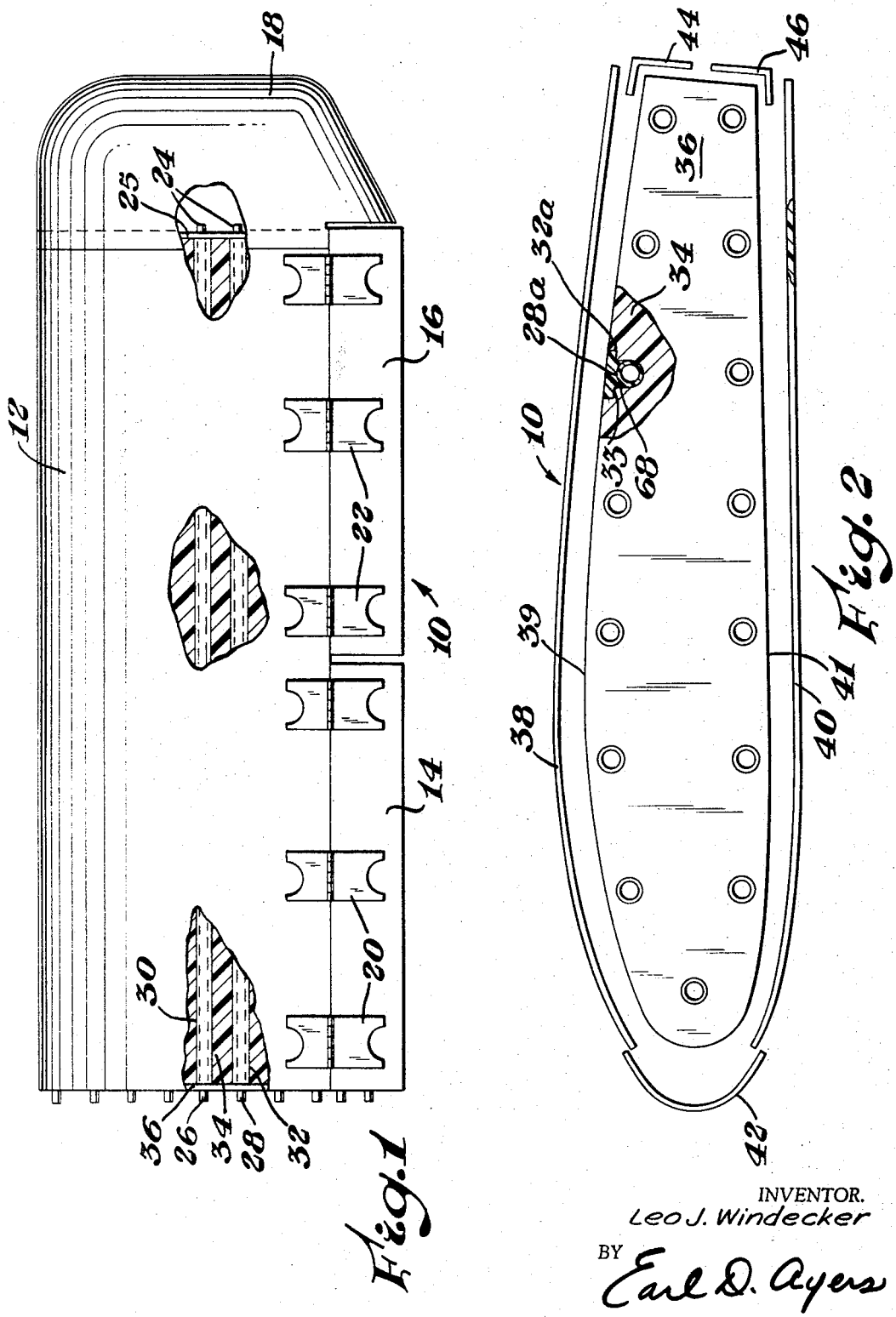
INVENTOR.
Leo J. Windecker
BY Earl D. Ayers
AGENT Dec. 17, 1968   L. J. WINDECKER   3,416,756
AIRFOIL STRUCTURE
Filed Aug. 3, 1966   2 Sheets-Sheet 2

INVENTOR.
Leo J. Windecker
BY Earl D. Ayers
AGENT

United States Patent Office 3,416,756
Patented Dec. 17, 1968

3,416,756
AIRFOIL STRUCTURE
Leo J. Windecker, Midland, Tex., assignor to The Dow Chemical Company, Midland, Mich., a corporation of Delaware
Filed Aug. 3, 1966, Ser. No. 569,871
18 Claims. (Cl. 244—123)

ABSTRACT OF THE DISCLOSURE

This invention relates to airfoil structures in which the body of the airfoil is made of structurally rigid foamed material. The outer surfaces of the airfoil have an array of spaced apart longitudinally disposed slots therein which each contain a spar element. Each slot is closed by a plug of structurally rigid foamed material, and the spar elements are bonded both to the slots and to the plugs. The airfoil body is covered by a skin which is bonded to the body.

---

This invention relates to an improved airfoil structure having a cellular plastic core and to its method of manufacture. It relates more particularly to an improved unitary wing structure having increased strength and to a simplified and time-saving method of manufacturing such a structure.

For many years the materials of construction and basic aircraft wing design have remained in the same stage of development employing ribs, bracing members, stringers of wood or aluminum, skins of fabric or riveted alloys of light metals, e.g., aluminum. Wing design, therefore, has been limited by the materials of construction to a narrow range of strengths, weights, and design characteristics.

Some attempts have been made in recent years. However, to fabricate wing structures having a cellular plastic core which are light in weight which are covered by a variety of skins including aluminum and fiber glass. In some instances, stiffener elements such as aluminum I beams, L beams or box spars have been employed to add strength and rigidity to the structure. However, such prior art wing structures have, in general, been found to be unsuitable for use on commercially licensed aircraft because of their inability to withstand one or more of the forces, such as, shear, compression, vibration, torque, tension, etc., that are encountered in flight. These wings in general, employ the foam core as a filler to maintain the airfoil shape of the skin.

It is therefore, an object of this invention to provide an airfoil structure having improved weight, strength and fatigue characteristics.

It is a further object of this invention to provide an improved, simplified and easy to construct airfoil structure having desirable weight, strength and fatigue characteristics.

An additional object of this invention is to provide an improved method of making airfoil structures.

Yet another object of this invention is to provide a more economical to use method of making an airfoil structure.

Still another object of this invention is to provide an improved, stronger airfoil structure having a shaped core element which has no transverse or span-wise interruptions, and which is dimensionally stable.

The invention, as well as additional objects and advantages thereof, is described in the following detailed description, reference being made to the accompanying drawings wherein:

FIGURE 1 is a plan view of an assembled wing structure with portions cut away to show internal structure;

FIGURE 2 is an end view of an airfoil structure made in accordance with this invention, partly broken away and in section, of the wing of FIGURE 1.

In the various figures, like numerals designate like parts.

Figure 3:
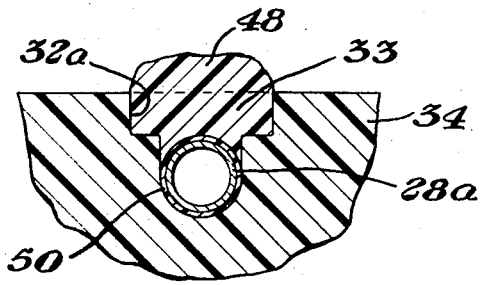
FIGURE 3 is a fragmentary sectional view of a wing made in accordance with this invention and showing the "plug" of foamed-in-place plastic before the excess plastic is trimmed.

The wing, indicated generally by the numeral 10, shown in FIGURES 1 and 2 comprises a body part 12 including a central or core part 34 composed of rigid foamed material, usually polyurethane, and covered by a suitable skin, 38, 40, 42, 44, 46, which is bonded to the core part 34 by a suitable adhesive, usually an epoxy resin. Spars 26, 28, usually aluminum or glass fiber reinforced rigid plastic hollow elements, extend along and within the core part 34. The spars are adapted to be rigidly secured to an aluminum base plate or root attachment rib 36 disposed at the inboard end of the wing, for example.

The spars 26, 28 pass through a terminal plate 25 at the outboard end of the wing and their ends 24 are usually coupled to or secured aaginst the plate 25.

The wing tip 18 is made as a separate structure and is secured to the outboard end of the wing by any suitable means.

The wing tip 18 is composed of a foamed core element which is pre-formed to shape and is covered with a skin of glass fiber, as is the body part of the wing, the skin being bonded to the core of the tip by a suitable adhesive such as an epoxy resin adhesive, for example. The end section of the wing tip 18 which adjoins the body part 12 of the wing is usually bonded to the wing. The glass fiber skin covering the wing tip 18 usually extends beyond the inboard end of the wing tip 18 and is bonded to the outer surface of the wing. The tip and wing thus form a unitary structure.

The wing structure 10, like the wing tip 18, is covered with a skin, as previously mentioned. The skin usually is composed of epoxy resin impregnated glass fiber in sheet form, the skin being bonded to the foamed core part 34 with a suitable adhesive, such as an epoxy resin adhesive.

A flap 14 and aileron 16 are secured to the trailing edge part of the wing by hinges 20, 22, respectively. The internal controls leading to the flap and aileron are not shown, since they are not part of this invention.

FIGURE 2 is an end view of the wing structure (without the wing flap 14) showing a preferred manner of applying the epoxy resin adhesive and the resin impregnated woven glass fiber skin to the assembled core structure. Elongated strips 44, 46, respectively, are made of epoxy impregnated woven glass fiber and usually are pre-formed to the bending radius of the trailing edges, respectively, of the wing section by means of an epoxy resin adhesive. An elongated sheet of epoxy impregnated woven glass fiber 38 which is as wide as the width of the wing and as long as the length of the wing is then bonded to the upper surface 39 of the wing section by means of an epoxy resin adhesive. An elongated sheet of epoxy impregnated woven glass fiber 40, similar to the sheet 38, is then bonded to the lower side 41 of the wing by means of an epoxy resin adhesive. Finally an elongated strip of epoxy impregnated woven glass fiber 42 is bonded by means of an epoxy resin adhesive to the leading edge of the wing section, overlapping sheets 38 and 40.

As may better be seen in FIGS. 2 and 3, the spars of the array of spars in the wing are disposed in slots or grooves (such as 50 in FIG. 3 or 66 in FIG. 5) which are in the peripheral surface of the core part 34 of the wing.

The slots extend along the body part of the wing from the inboard end to the outboard end, the depth of the slot being greater than the diameter of the spar and the minimum width of the groove being such that the spar may enter the slot and be disposed along the bottom of the slot.

The slots 68, which appear in the upper and lower surfaces of the wing, are preferably disposed in vertical pairs, as is seen by the disposition of the spars in FIG. 2.

The spars, 26, 28, for example, are bonded to the wall of the slot or groove 32 along the lower half of the periphery of the spar and are bonded to the foamed plastic insert (33 in FIG. 3) which fills the slot 32 above the spar 26 or 28.

Figure 4:
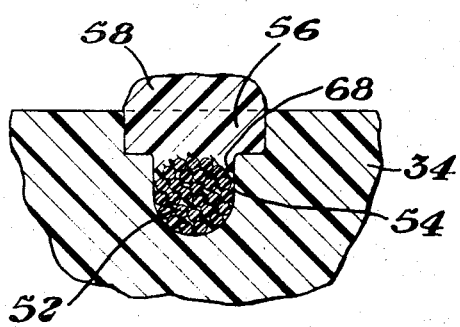
FIGURE 4 is a fragmentary view of a wing section showing glass fiber "formed-in-place" spars.
Figure 5:
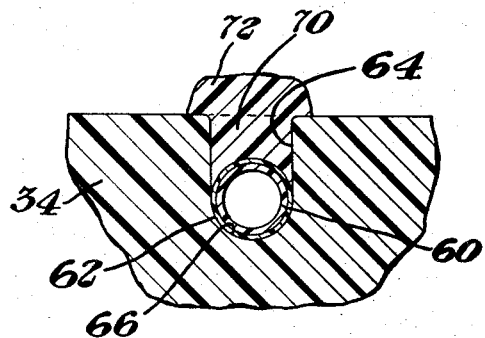
FIGURE 5 is a fragmentary sectional view of a wing section showing an alternative groove configuration into which the spars fit.

Usually, as shown in FIGS. 3, 4, and 5, the foamed plastic material above the spar in the slot is applied by foaming in place techniques. The excess foamed plastic material (48 in FIG. 3) is then cut or ground away so the wing surface above the slots is as shown in FIG. 2, for example.

The "plug" of foamed plastic material is bonded to the spar it contacts, but is not bonded to the wall of the slot 32 (or 32a in FIG. 3). While foamed "plugs" are conveniently made by foaming in place techniques, it is also practical to use pre-formed plugs which fit closely against the wall of the slot and against the spar in the slot. In such instances, too, the plug is bonded only to the spar.

As shown in FIG. 3, the spar 28a is made of metal which is bonded to the wall of the slot and plug 33 by adhesive material 50.

FIG. 5 shows an alternatively shaped slot 62 whose side walls 64 are parallel and extend directly upwardly, without any offset, from the rounded bottom of the slot. A plastic tubular spar 60, made of glass fiber reinforced epoxy resin material, for example, is bonded by means of an epoxy adhesive 66 to the wall of the slot and to the foamed plastic plug 70. The excess part 72 of the plug is to be ground or cut away, as described in connection with FIG. 3.

In the embodiment shown in FIG. 4, the spar 54 is a solid rod composed of glass reinforced fibers surrounded and bonded together by an epoxy resin or other suitable material. The bonding material is also bonded to the foamed plastic plug 56 whose excess part 58 is adapted to be removed by grinding or cutting as explained before.

Figure 6:
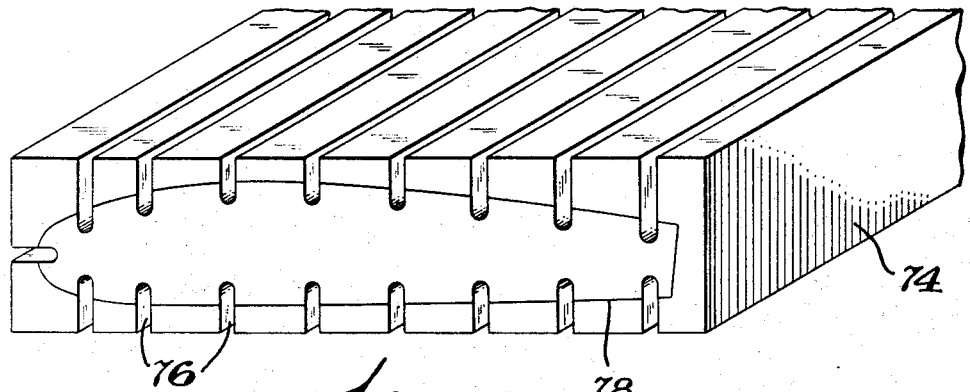
FIGURE 6 is a fragmentary isometric view showing how the wing body may be fashioned from a plank element.

The slots or grooves 32 are cut or ground into the wing surfaces. FIG. 6 shows a block 74 of foamed plastic material having a plurality of slots or grooves 76 extending lengthwise of the block. The depth of each slot or groove is a function of the cross sectional shape of the wing structure to be made from the block 74, as may be seen with respect to the wing section outline 78. Following the forming of the grooves or slots 76, the block is then cut, grooved, shaved, or otherwise formed to the configuration of the wing core, with the bottoms of the slots or grooves being at their predetermined locations and depth within the core structure.

It has been discovered that a wing or airfoil structure made from a cellular foam core section, tubular spars and a glass fibered skin, in accordance with this invention is light in weight yet sufficiently strong and rugged to withstand, with a substantial safety margin, the stress, compression, torque and vibration encountered in flight. In order to achieve the requisite light weight together with the necessary strength characteristics, it has been found necessary to form the wing structure of a core section bonded to elongated spars which extend through the core sections near the peripheral surfaces thereof with an insoluble polymeric adhesive, as explained above. The core section 12 is made of a foamed, cellular polymer having a tensile strength of at least 40 lbs./in.$^2$, a compression strength of at least 25 lbs./in.$^2$, which is less than 3 lbs./ft.$^3$ in density, and, preferably, which is insoluble in hydrocarbons. It is preferred to make the core sections from a cellular polymeric material having a tensile strength of between 50 and 75 lbs./in.$^2$, a compression strength of at least 35 lbs./in.$^2$ and a density of less than 2 lbs./ft.$^3$. Polyurethane rigid foam is preferred, but other foamed polymers such as polystyrene, phenol-formaldehyde, epoxy, and other synthetic foamed materials as well as foamed metals, such as aluminum, having suitable density, would also be suitable for the wing core.

In order to achieve the purpose of this invention, it is desirable for the elongated tubular spars which extend laterally through the foam core to be spaced equidistant from one another, and to be arranged in vertical pairs (that is, one above the other as viewed looking endwise into the wing structure). The spars must not be in contact with the skin since the deformity of the foam under stress brings about the desired load distribution. The thickness of foam between spar and skins is determined as a function of the shear modulus and strength of the foam related to the tensile strength and modulus and the surface area of the spar at any given stress level. It is desirable to have a minimum of an upper and lower pair of spars 14 for each chordwise center of pressure location within the wing. This normally requires a minimum of three pairs of spars, i.e. one pair of spars for the high angle of attack center of pressure, one for the low angle of attack center of pressure, one for the inverted flight center of pressure. Many designs include an additional pair of spars for the cruising angle of attack center of pressure. The center of pressures referred to in this application are those used in conventional stress analysis in the field of aeronautics.

In a conventional wing structure of the type usually used on relatively light weight aircraft, the center of pressure varies as the angle of attack of the wing varies, i.e. as the angle of attack of the wing increases, the center of pressure moves toward the trailing edge of the wing. It is felt that the multi-spar, foam filled construction used in wings made in accordance with this invention provides a more efficient structure than is obtainable by conventional construction methods, particularly in regard to its ability to withstand the varying load conditions described above.

It is desirable in this structure to make the spars 26, 28 of tubing which is as thin walled as is practical, consistent with mechanical handling and strength. In general, however, tubing from 0.25 to 1.25 inches in outside diameter and from 0.010 to 0.05 inch wall thickness is suitable for use in wings intended for usage on light aircraft.

The size of the tubing is determined by the relation of surface area of the tubing, tensile strength, and tensile modulus necessary to transmit the anticipated load into the foam core without producing failure in the core or spar. For example if the ultimate load to be transmitted by a given spar of 12 foot semi-span is 1,200 pounds tension and 600 pounds compression and if the shear strength of the foam core material is 50 p.s.i., then 1200/500=240 square inches would be the required surface area of the tube in contact with (bonded to) the foam.

In terms of tubing circumference, this would be a circumference of 1.666 inches. If the normal aircraft safety factor is added the circumference would need to be 2.54 inches or a tube having an outside diameter of $^{13}/_{16}$ inch. Tensile strength of the alloy to be used in the spar times the circumference will then determine the wall thickness of the tube to be used.

It is important that the tubing does not elongate beyond the elastic limit of the foam during stress loading. Therefore, the modulus of the tube may control the wall thickness of the spar rather than just the tensile strength.

A wing structure made in accordance with this invention has the ability to stress relieve itself by more or less equally distributing the force moments throughout the wing structure rather than having point or area applied force moments which are common to other wing structures. It is this improved force distribution which provides wings built in accordance with this invention with exceptional strength for any given weight as compared to wings constructed in a conventional manner.

The insoluble polymeric adhesive usually employed is an epoxy resin but other adhesives such as polyesters, polyurethanes, and phenol-formaldehyde condensates may also be used and are within the scope of this invention.

It is likewise necessary, in accordance with this invention, as heretofore mentioned, that the wing be covered with a hard, smooth, impact resistant skin whose surface is bonded to the abutting surfaces of the core section of the wing. Usually, the skin is made of epoxy resin impregnated woven glass fibers which gives improved strength and impact resistance, is easy to apply and shape, and will adhere well to the foamed core section. However, materials such as polyester impregnated woven glass fibers or aluminum sheeting would, for example, also be suitable as the skin material.

A right wing section 12½ feet long constructed in accordance with this invention which has a 60 inch chord and a Clark Y airfoil has been successfully tested and flown, being lighter yet superior in strength to conventionally constructed wings.

Wings made in accordance with this invention are easy to fabricate with relatively simply manufacturing equipment and are inherently stronger per unit of weight than are wings of similar size made in accordance with prior art construction forms and methods.

While wings made in accordance with this invention have been described in connection with a core section which is a "solid" foamed structure, it is recognized that the core section must of necessity have cut out parts. For example, the core element must have bores extending transversely therethrough to permit actuation of the flap and aileron by their control rods. Structural elements such as the hinge boxes for the aileron and flap, require that some part of the core section be cut away to permit mounting of the hinge boxes to the spars. While not illustrated in the drawings, it is anticipated that suitable cutouts could be provided in the core section to permit a fuel cell, for example, to be installed therein and bonded to the wing structure without departing from the spirit of this invention.

What is claimed is:

1. An airfoil structure comprising:
    (A) A core section having an overall airfoil configuration and including a top, bottom, leading edge, trailing edge and inboard and outboard ends, said core section being made of structurally rigid foamed material;
    (B) An array of spaced apart slots, said slots extending into said core section at least from said top and bottom and extending from said inboard end at least near to said outboard end, said slots each having a transverse cross sectional configuration which is adapted to receive a spar element within said slot;
    (C) An array of rod-like spar elements, said spar elements each being disposed within one of said slots and below the surface of the part of the core section in which the slot is disposed;
    (D) An array of plug elements, said plug elements being composed of structurally rigid foamed material, each of said plug elements being disposed in and filling one of said slots above the spar element in said slot, each of said spar elements being bonded to said slot and to said plug element in said slot, and
    (E) A sheet-like skin, said skin covering and being bonded to said core section.

2. An airfoil structure in accordance with claim 1, wherein said skin is composed of glass fiber cloth impregnated with a resinous material and is continuously bonded to said core section on its surface facing said core section.

3. An airfoil structure in accordance with claim 1, wherein said core section and said plug elements are made of foamed plastic material.

4. An airfoil structure in accordance with claim 1, wherein said core section is made of foamed closed cell polyurethane.

5. An airfoil structure in accordance with claim 1, wherein said core section is monolithic in structure.

6. An airfoil structure is accordance with claim 1, wherein said spar elements are substantially circular in cross sectional configuration and make generally hemispherical contact with the wall of the slot the spar element is disposed in.

7. An airfoil structure in accordance with claim 1, wherein said spar elements are arranged in spaced apart vertical pairs, each spar element being adjacent to but spaced from the peripheral surface of said core section.

8. An airfoil structure in accordance with claim 1, wherein said spar elements are hollow tubes made of glass fiber reinforced plastic material.

9. An airfoil structure in accordance with claim 1, wherein said spar elements are hollow metal tubes.

10. An airfoil structure in accordance with claim 1, wherein said spar elements are solid plastic rods reinforced with glass fibers.

11. An airfoil structure in accordance with claim 1, wherein said slots are generally of U-shaped transverse cross sectional configuration.

12. An airfoil structure in accordance with claim 1, wherein said slots on said top and said bottom are parallel to each other.

13. An airfoil structure in accordance with claim 1, wherein said slots have a rectangular transverse cross sectional configuration adjacent to the peripheral surface of said core section and a generally U-shaped transverse cross sectional configuration disposed symmetrically below the part having the rectangular cross sectional configuration.

14. An airfoil structure in accordance with claim 1, wherein said slots are equal in depth.

15. An airfoil structure in accordance with claim 1, wherein said spar elements are bonded to the wall of said slot and to said plug elements with an epoxy resin adhesive material.

16. An airfoil structure in accordance with claim 1, wherein said spar elements have coupling means at the ends thereof adjacent to the inboard end of said core section.

17. A method of making an airfoil structure, comprising forming a substantially monolithic block of structurally rigid foamed material into the general configuration of a desired airfoil including top surface, bottom surface, leading edge, trailing edge, inboard and outboard ends, forming longitudinally extending slots in said formed block from the inboard end to at least near to the outboard end thereof on said top and bottom surfaces, placing spar elements into said slots and below the level of said top or bottom surfaces, inserting a plug element made of foamed material in each of said slots above said spar element in said slot to close said slot, bonding each of said spar elements to the wall of its slot and to the plug element in its slot, covering said block with a sheet-like skin, and bonding said skin to said block.

18. A method in accordance with claim 17, wherein said spar elements are formed in said slots by placing fibers along said slots and then distributing settable plastic material in said slots and over and around said reinforcing fibers, and then setting said plastic material to form a rigid, elongated bar-like element.

References Cited

UNITED STATES PATENTS

| | | | |
|---|---|---|---|
| 2,987,300 | 6/1961 | Greene | 29—157.3 |
| 3,145,000 | 8/1964 | Mackie | 244—1 |
| 3,174,711 | 3/1965 | Sullivan | 244—123 |
| 3,273,833 | 9/1966 | Windecker | 244—124 |

FOREIGN PATENTS

| | | |
|---|---|---|
| 625,778 | 7/1949 | Great Britain. |
| 720,956 | 12/1954 | Great Britain. |

MILTON BUCHLER, *Primary Examiner.*

T. W. BUCKMAN, *Assistant Examiner.*

U.S. Cl. X.R.

244—119